United States Patent
Chan

(10) Patent No.: US 8,000,589 B2
(45) Date of Patent: Aug. 16, 2011

(54) PORTABLE WATERPROOF EQUIPMENT HAVING A SEALING STRUCTURE COMPRISING A NUMBER OF SLOT GROUPS AND RIB GROUPS

(76) Inventor: Kei Chan, Hongkong (CN)

( * ) Notice: Subject to any disclaimer, the term of this patent is extended or adjusted under 35 U.S.C. 154(b) by 97 days.

(21) Appl. No.: 12/325,299

(22) Filed: Dec. 1, 2008

(65) Prior Publication Data

US 2009/0142045 A1 Jun. 4, 2009

(30) Foreign Application Priority Data

Nov. 30, 2007 (CN) ............... 2007 2 0171265 U

(51) Int. Cl.
*G03B 17/08* (2006.01)
*B65D 33/16* (2006.01)

(52) U.S. Cl. ........... 396/27; 396/429; 383/61.2; 383/63; 206/316.2

(58) Field of Classification Search ............... 396/27; 206/316.1, 316.2, 811; 383/61.1, 61.2
See application file for complete search history.

(56) References Cited

U.S. PATENT DOCUMENTS

| | | | | | |
|---|---|---|---|---|---|
| 1,743,509 | A | * | 1/1930 | Zauner | 383/82 |
| 3,998,304 | A | * | 12/1976 | Edgerton et al. | 190/107 |
| 4,033,392 | A | * | 7/1977 | Less | 206/316.2 |
| 4,155,453 | A | * | 5/1979 | Ono | 206/522 |
| 4,176,701 | A | * | 12/1979 | Welgan | 206/316.2 |
| 4,549,589 | A | * | 10/1985 | Nguyen | 206/316.2 |
| 4,751,950 | A | * | 6/1988 | Bock | 206/316.2 |
| 4,982,841 | A | * | 1/1991 | Goedecke | 206/316.2 |
| 5,101,974 | A | * | 4/1992 | Alwitt | 206/316.2 |
| 5,511,884 | A | * | 4/1996 | Bruno et al. | 383/63 |
| 5,848,299 | A | * | 12/1998 | Shepper | 396/29 |
| 5,966,790 | A | * | 10/1999 | Meedt | 29/239 |
| 6,149,302 | A | * | 11/2000 | Taheri | 383/5 |
| 6,217,216 | B1 | * | 4/2001 | Taheri | 383/207 |
| 6,349,824 | B1 | * | 2/2002 | Yamada | 206/316.1 |
| 6,574,433 | B1 | * | 6/2003 | Stuempfl | 396/25 |
| 6,821,018 | B1 | * | 11/2004 | Denko | 383/59 |
| 7,653,291 | B2 | * | 1/2010 | Yeom | 396/27 |
| 7,674,039 | B2 | * | 3/2010 | McMahon et al. | 383/61.2 |
| 7,784,160 | B2 | * | 8/2010 | Dais et al. | 24/585.12 |
| 7,850,368 | B2 | * | 12/2010 | Pawloski et al. | 383/61.2 |
| 2002/0094198 | A1 | * | 7/2002 | Uchiyama | 396/25 |
| 2007/0058065 | A1 | * | 3/2007 | Saiki | 348/335 |
| 2007/0081689 | A1 | | 4/2007 | Chan | 381/374 |
| 2009/0003811 | A1 | * | 1/2009 | Berend et al. | 396/27 |
| 2009/0202232 | A1 | * | 8/2009 | Kawakami | 396/27 |

* cited by examiner

*Primary Examiner* — Clayton E Laballe
*Assistant Examiner* — Bret Adams
(74) *Attorney, Agent, or Firm* — Tim Tingkang Xia; Morris, Manning & Martin, LLP

(57) ABSTRACT

A portable waterproof equipment for containing an articles with a protruding part includes a body (1) having an opening and a wall (12), a sealing structure for sealing the opening of the body (1), a through hole (14) defined in the wall (12), a chamber (16) configured for accommodating the protruding part of the articles connected with the wall (12) at the periphery of the through hole (14), and a sealing device (18) located between the chamber (16) and the wall (12). When in use, put the articles into the body (1) and locate the protruding part into the chamber (16), so the waterproof equipment accommodates the articles with protruding part without any transformation.

9 Claims, 2 Drawing Sheets

PORTABLE WATERPROOF EQUIPMENT HAVING A SEALING STRUCTURE COMPRISING A NUMBER OF SLOT GROUPS AND RIB GROUPS

BACKGROUND OF THE INVENTION

1. Field of the Invention

This invention relates to a waterproof equipment, and particularly to a portable waterproof equipment for containing articles with protruding parts.

2. Background

A conventional portable waterproof package generally employs a plastic zipper arranged at an opening thereof. The plastic zipper comprises an elongated slot and a rib. The rib is firmly received in the slot to thereby seal the opening of the package. Therefore, the package has water-proof capability. Additionally, the conventional portable waterproof package generally has a flattening main body.

However, when articles having protruding parts, such as cameras with zoom lens, are packaged in the above conventional portable waterproof equipment, the protruding parts of the articles push against the body of the conventional portable waterproof equipment, therefore the flattening body of the conventional portable waterproof equipment will be transformed along with the protruding parts of the articles. At the same time, the transformed body of the conventional portable waterproof equipment pushes against the protruding part of the article and presses it. Consequently, the protruding part of the article such as zoom lens is additionally burdened, which accelerate wearing down of the mechanism of the protruding part such as zoom lens. Furthermore, transformed body of the waterproof equipment forms curved edges, which affect vision field of zoom lens in the waterproof equipment. Additionally, water pressure pushes the body and inevitably pushes the zoom lens, so when in deep water, sometimes the zoom lens draws back and shuts down due to the water pressure automatically.

Furthermore, conventional portable waterproof equipment generally employs only one plastic zipper. Therefore, requirement of rigidity to the material of the plastic zipper is correspondingly high. However, it is difficult to control the rigidity of the material of the plastic zipper. If the material of the plastic zipper is too soft the plastic zipper is easy to be opened. If the material of the plastic zipper is too hard the plastic zipper is easy to be damaged in operation. Thus from the above, water-proof property of the conventional portable waterproof equipment is not good enough.

SUMMARY OF THE INVENTION

The primary objective of this invention is to provide a portable waterproof equipment which can package articles with protruding parts.

Another objective of this invention is to provide a portable waterproof equipment with improved water-proof property.

A portable waterproof equipment for containing an articles with a protruding part includes a body having an opening and a wall, a sealing structure for sealing the opening of the body, a through hole defined in the wall, a chamber configured for accommodating the protruding part of the articles connected with the wall at the periphery of the through hole, and a sealing device located between the chamber and the wall of the body. When in use, put the articles into the body and locate the protruding part into the chamber, so the waterproof equipment accommodates the articles with protruding part without any transformation.

For more detailed information regarding advantages or features of this invention, at least an example of preferred embodiment will be fully described below with reference to the annexed drawings.

BRIEF DESCRIPTION OF THE DRAWINGS

The related drawings in connection with the detailed description of this invention to be made later are described briefly as follows, in which.

DETAILED DESCRIPTION OF THE INVENTION

Figure 1:
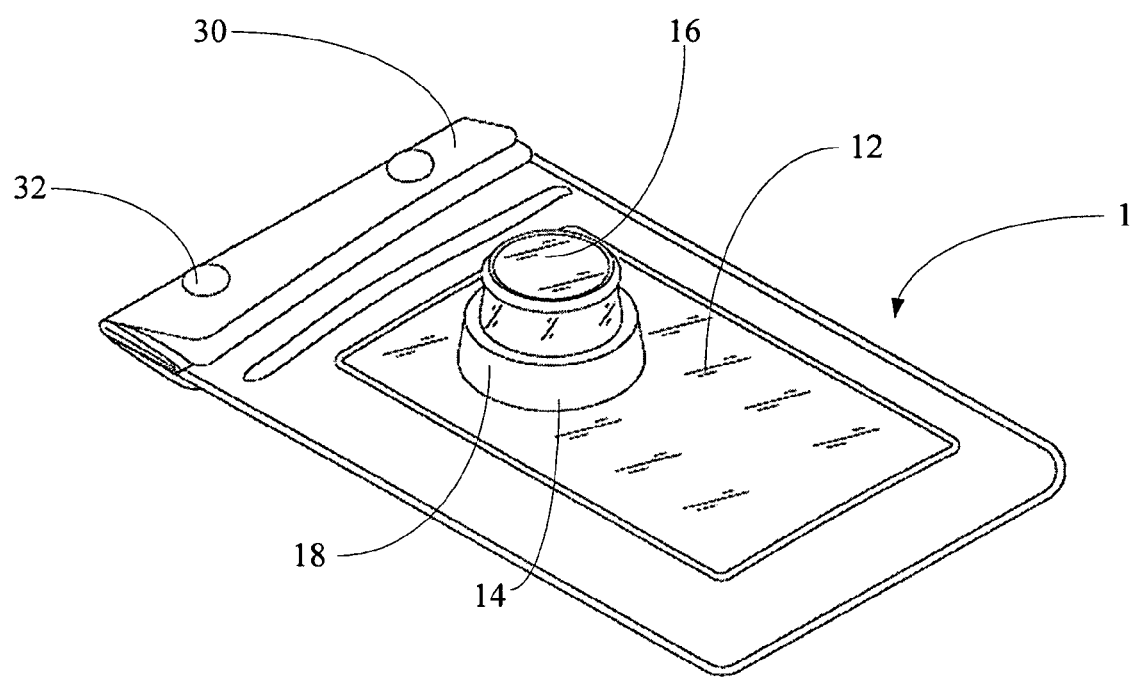
FIG. 1 is a schematic view of a portable waterproof equipment in accordance with a preferred embodiment of the present invention.

Referring to FIG. 1, a portable waterproof equipment in accordance with a preferred embodiment of the invention comprises a hollow body 1 for containing articles (not shown) therein and a sealing structure for sealing an opening of the body 1. The articles have a protruding part. In the embodiment, the articles may be a camera with zoom lens. The body 1 is made of transparent material so that the user can see the articles in the body from outside.

The body 1 has two walls. A through hole 14 is defined in one wall 12. A chamber 16 configured for accommodating the protruding part of the articles is connected with the wall 12 at the periphery of the through hole 14. The chamber 16 is made of transparent material so that the user can see the articles in the chamber 16 from outside. A sealing device 18 is located between the chamber 16 and the wall 12 of the body 1 and the periphery thereof is sealed.

In the present invention, the through hole 14 may be defined in any position of the wall 12. The through hole 14 and the chamber 16 may be round, square or ellipse. In a preferred embodiment, aperture of the through hole 14 is large than 45 mm so that it is convenient to put various articles with various protruding part therein.

Figure 2:
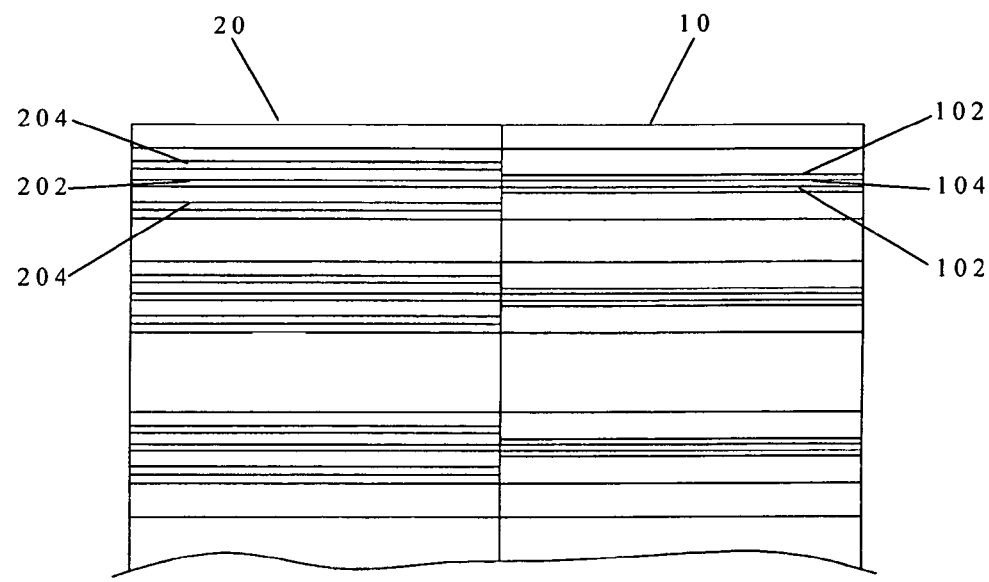
FIG. 2 is an extended plan view of a sealing structure of the portable waterproof equipment.
Figure 3:
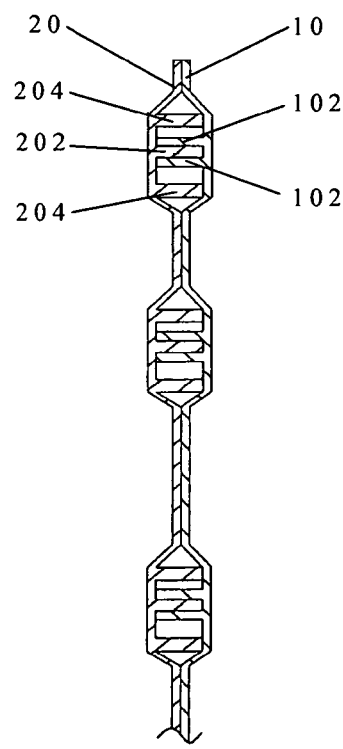
FIG. 3 is a cross-sectional view of the sealing structure when the portable waterproof equipment is close.

Referring to FIGS. 2-3, the sealing structure for sealing the opening of the body 1 is shown. The sealing structure comprises two parallel straps 10, 20 arranged along the edge of the opening of the body 1. The strap 10 comprises three pairs parallel strips 102 protruding inwardly from the inner side thereof. A slot 104 is provided between each pair of strips 102. The strap 20 comprises a plurality of ribs 202 for being received into the slots 104 of the strap 10 respectively. The width of the slot 104 is slightly smaller than the thickness of the corresponding rib 202 so that the rib 202 can be firmly received in the slot 104. A pair of parallel protruding bars 204 is formed at upper and lower sides of each rib 202. The protruding bars 204 abut against the inner side of the strap 10 when the ribs 202 are received in the slots 104. In the present invention, the number of the slots 104 is not limited to three and can be any number more than two.

When the sealing structure described above is closed, each rib 202 is sandwiched between the corresponding two strips 102 and therefore firmly received in the corresponding slot 104. The protruding bars 204 of the strap 20 abut against the inner side of the strap 10. The inner sides of the two straps 10, 20 located between each pair of the protruding bars 204 contact with each other.

Referring to FIG. 1 again, for improving water-proof capability of the package, a cover 30 may be provided at the outside of the strap 20. One part 302 of a hooks & loops fastener (Velcro tape) is arranged at inner side of the cover 30. The other mated part (not shown) of the hooks & loops fastener is provided at the outside of the strap 10. When the sealing structure is closed and the ribs 202 are received in the slots 104, the straps 10, 20 are rolled downwardly to cause the two mated parts of the hooks & loops fastener of the cover 30 and the strap 10 to engage with each other. Alternatively, the hooks and loops fastener may be replaced with other structures, such as: a pair of joggled snap buttons provided at the cover 30 and the body 1 respectively.

Alternatively, under the condition that the strap 10 has an enough thickness, the slots 104 may be directly defined in the strap 10 without forming the strips 102. In addition, the body 1 can be any structure which can contain articles and has an opening for providing an access for the articles entering into the body 1.

In the present invention, the sealing structure employs a plurality of joggled ribs and slots which can substantially isolate the inner side of the body 1 from the outer side of the body 1. It is also difficult for air to pass through the sealing structure.

When in use, put the articles into the body 1 and locate the protruding part into the chamber 16, therefore the waterproof equipment accommodates the articles with protruding part without any transformation.

In some embodiments, a thin connecting piece (not shown) can be provided at the strap 20. The connecting piece comprises upper and lower edges secured at the strap 20 respectively. A passage is therefore formed between the upper and lower edges. A rope passes through the passage and can be hang to a neck of the user, whereby facilitating taking of the package.

In some embodiments, for adapting to articles has more than one protruding parts, more than one corresponding chambers are arranged on the water equipment in accordance with the present invention.

In the above described, at least one preferred embodiment has been described in detail with reference to the drawings annexed, and it is apparent that numerous variations or modifications may be made without departing from the true spirit and scope thereof, as set forth in the claims below.

What is claimed is:

1. A portable waterproof equipment for accommodating articles with a protruding part comprising:
   a body for containing the articles having an opening and a wall,
   a sealing structure for sealing the opening of the body,
   a through hole defined in the wall, and
   a chamber configured for accommodating the protruding part of the articles connected with the wall at the periphery of the through hole,
   wherein the sealing structure comprises two parallel straps arranged at an edge of the opening, one of the straps comprising a number of slot groups with each slot group having a plurality of slots, the other of the straps comprising a respective number of rib groups with each rib group having a plurality of ribs, each slot configured to receive a respective rib, wherein as assembled, the inner side of the one of the straps between any two neighboring slot groups is in contact with the inner side of the other of the straps between respective two neighboring rib groups.

2. The portable waterproof equipment as claimed in claim 1, wherein a sealing device is located between the chamber and the wall of the body.

3. The portable waterproof equipment as claimed in claim 1, wherein the through hole and the chamber may be round, square or ellipse.

4. The portable waterproof equipment as claimed in claim 1, wherein aperture of the through hole is larger than 45mm.

5. The portable waterproof equipment as claimed in claim 1, wherein the body is made of transparent material.

6. The portable waterproof equipment as claimed in claim 1, wherein the chamber is made of transparent material.

7. The portable waterproof equipment as claimed in claim 1, wherein said one of the straps further comprises a plurality of pairs of strips, and each slot is formed between a pair of corresponding strips.

8. The portable waterproof equipment as claimed in claim 7, wherein said other strap further comprises a pair of protruding bars formed at opposite sides of each rib, the bars abutting against the inner side of said one of the straps when the ribs are received in the slots.

9. The portable waterproof equipment as claimed in claim 8, wherein when the ribs are received in the slots the inner sides of the two straps located between each pair of protruding bars contact with each other.

* * * * *